(12) United States Patent
Eto

(10) Patent No.: US 10,084,927 B2
(45) Date of Patent: Sep. 25, 2018

(54) IMAGE FORMING APPARATUS FOR DETERMINING AN ABNORMAL VOLTAGE ADJUSTMENT OF THE PROCESSOR

(71) Applicant: KYOCERA Document Solutions Inc., Osaka (JP)

(72) Inventor: Koji Eto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 162 days.

(21) Appl. No.: 15/233,444

(22) Filed: Aug. 10, 2016

(65) Prior Publication Data

US 2017/0054856 A1 Feb. 23, 2017

(30) Foreign Application Priority Data

Aug. 17, 2015 (JP) ................. 2015-160316

(51) Int. Cl.
*H04N 1/00* (2006.01)
*G03G 15/00* (2006.01)

(52) U.S. Cl.
CPC ..... *H04N 1/00042* (2013.01); *G03G 15/5004* (2013.01); *G03G 15/80* (2013.01); *H04N 1/00021* (2013.01); *H04N 1/00076* (2013.01); *H04N 1/00084* (2013.01); *H04N 1/00904* (2013.01); *H04N 2201/0094* (2013.01)

(58) Field of Classification Search
CPC ................. G03G 15/5004; H04N 1/00904
See application file for complete search history.

(56) References Cited

U.S. PATENT DOCUMENTS

| 2003/0161646 | A1 | 8/2003 | Nagata ........................... 399/38 |
| 2005/0117773 | A1* | 6/2005 | Kobayashi ............ G06F 9/4411 382/100 |
| 2007/0183192 | A1* | 8/2007 | Barnum .............. G06F 13/1642 365/180 |
| 2008/0010477 | A1* | 1/2008 | Nakamura ......... H04N 1/00885 713/323 |
| 2009/0213125 | A1* | 8/2009 | Shibasaki ............. G06F 1/3203 345/501 |

(Continued)

FOREIGN PATENT DOCUMENTS

JP 2003-251901 A 9/2003
JP 2007-34963 A 2/2007

(Continued)

*Primary Examiner* — Benjamin O Dulaney
(74) *Attorney, Agent, or Firm* — Stein IP, LLC

(57) ABSTRACT

In an image forming apparatus, when a processor starts to be supplied with a voltage in a first voltage range from a voltage generator, the processor executes start-up processing with an operation clock of a first frequency, and transmits a voltage adjustment instruction to the voltage generator. On receiving the voltage adjustment instruction, the voltage generator performs voltage adjustment to make the voltage supplied to the processor a voltage in a second voltage range. On completion of the voltage adjustment, the voltage generator transmits a completion notice to the processor. When communication related to the voltage adjustment does not end normally, the processor keeps the frequency of the operation clock at the first frequency to execute processing; thereafter based on the operation clock of the first frequency.

7 Claims, 6 Drawing Sheets

(56) References Cited

U.S. PATENT DOCUMENTS

| | | | |
|---|---|---|---|
| 2010/0063759 A1* | 3/2010 | Nishiyama | G06F 11/24 702/64 |
| 2011/0107128 A1* | 5/2011 | Otani | G06F 3/122 713/321 |
| 2011/0115567 A1 | 5/2011 | Sutardja | 331/34 |
| 2014/0073240 A1* | 3/2014 | Gree | H04W 52/0216 455/41.1 |
| 2015/0055160 A1 | 2/2015 | Ito | 358/1.13 |
| 2016/0352949 A1* | 12/2016 | Niimura | H04N 1/00896 |

FOREIGN PATENT DOCUMENTS

| | | |
|---|---|---|
| JP | 2010-197790 A | 9/2010 |
| JP | 2011-98505 A | 5/2011 |
| JP | 2013-511096 A | 3/2013 |
| JP | 2015-20361 A | 2/2015 |
| JP | 2015-39776 A | 3/2015 |

\* cited by examiner

US 10,084,927 B2

IMAGE FORMING APPARATUS FOR DETERMINING AN ABNORMAL VOLTAGE ADJUSTMENT OF THE PROCESSOR

INCORPORATION BY REFERENCE

This application is based upon and claims the benefit of priority from the corresponding Japanese Patent Application No. 2015-160316 filed on Aug. 17, 2015, the entire contents of which are incorporated herein by reference.

BACKGROUND

The present invention relates to an image forming apparatus provided with a processor that performs various kinds of operation.

An image forming apparatus is provided with a CPU (processor) that performs various kinds of operation. A voltage with which to operate the processor is generated by a DC/DC converter (voltage generator).

For example, a conventional image forming apparatus is provided with a main power supply. The main power supply generates a direct-current voltage from an alternating-current voltage, and outputs the direct-current voltage to a DC/DC converter. The DC/DC converter steps down the voltage generated by the main power supply to generate a voltage with which to operate the CPU. The CPU operates by being supplied with the voltage from the DC/DC converter.

SUMMARY

According to one aspect of the present disclosure, an image forming apparatus is provided with a processor and a voltage generator. The processor executes processing based on a set operation clock. The voltage generator is commumicably connected to the processor, and generates a voltage with which to operate the processor to supply the voltage to the processor. When the processor, in a state not supplied with a voltage, receives from the voltage generator a voltage in a first voltage range that is necessary for the processor to start up, the processor sets the frequency of the operation clock at a first frequency to execute start-up processing with the operation clock of the first frequency, and transmits to the voltage generator a voltage adjustment instruction to make the voltage generator supply a voltage in a second voltage range that is necessary for the processor to execute processing with the operation clock of a previously determined second frequency that is higher than the first frequency. When the voltage generator receives the voltage adjustment instruction, the voltage generator performs voltage adjustment to make the voltage supplied to the processor a voltage in the second voltage range, and, when the voltage adjustment is complete, the voltage generator transmits to the processor a completion notice conveying that the voltage adjustment is complete. When communication related to the voltage adjustment ends normally, the processor sets the frequency of the operation clock at the second frequency to execute processing thereafter based on the operation clock of the second frequency, and, when the communication related to the voltage adjustment does not end normally, the processor keeps the frequency of the operation clock at the first frequency to execute processing thereafter based on the operation clock of the first frequency.

DETAILED DESCRIPTION

An image forming apparatus according to one embodiment will be described below. The following description deals with, as an example, an image forming apparatus provided with a plurality of functions such as a scanning function, a copying function, a printing function, etc. That is, the image forming apparatus according to the embodiment is a multifunction peripheral, and is an apparatus that can perform a scan job (a job involving scanning), a copy job (a job involving scanning and printing), a print job (a job involving printing), etc.

Figure 1:
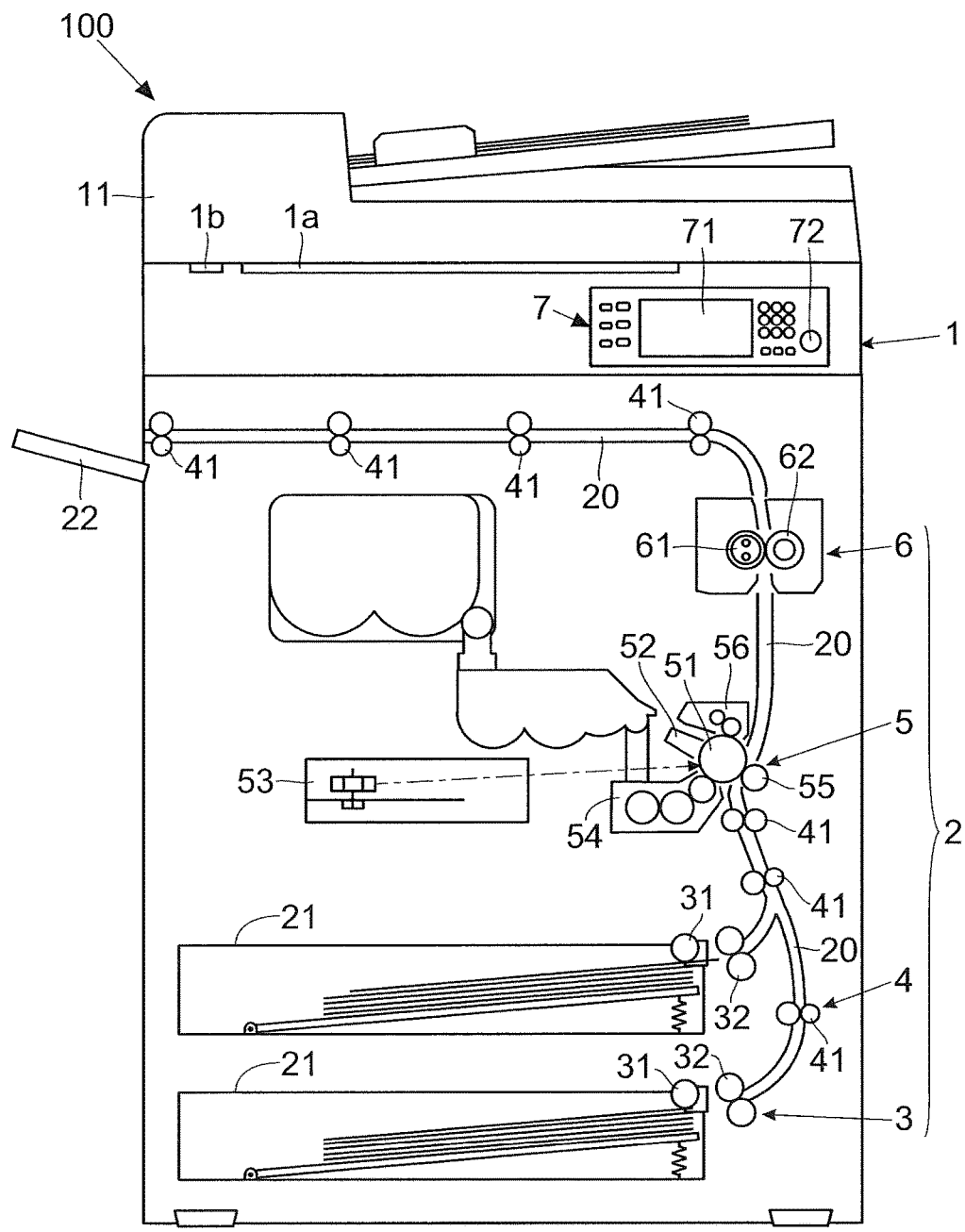
FIG. 1 is a diagram showing an overall configuration of an image forming apparatus according to one embodiment of the present disclosure.

Overall Configuration of an Image Forming Apparatus: As shown in FIG. 1, the image forming apparatus 100 according to the embodiment is provided with an image reading section 1, which includes a document transport unit 11. During execution of a scan job or a copy job, the image reading section 1 reads a document to generate image data of the read document.

The image reading section 1 has a frame in which a contact glass 1a for stationary reading and a contact glass 1b for transport reading are fitted. The image reading section 1 can perform stationary reading, in which it reads a document placed on the contact glass 1a, and transport reading, in which it reads a document moving across the contact glass 1b. In transport reading, the document is transported across the contact glass 1b by the document transport unit 11.

The image forming apparatus 100 is also provided with a printing section 2. During a copy job or a print job, the printing section 2 transports a sheet, and forms a toner image based on image data. The printing section 2 prints the toner image on the sheet that is being transported.

The printing section 2 is composed of a sheet feed portion 3, a sheet transport portion 4, an image forming portion 5, and a fixing portion 6. The sheet feed portion 3 includes a pickup roller 31 and a sheet feed roller pair 32, and feeds sheets stored in a sheet cassette 21 into a sheet transport passage 20. The sheet transport portion 4 includes a plurality of transport roller pairs 41, and transports sheets along the sheet transport passage 20.

The image forming portion 5 includes a photosensitive drum 51, a charging device 52, an exposing device 53, a developing device 54, a transfer roller 55, and a cleaning device 56. The image forming portion 5 forms a toner image based on image data, and transfers the toner image to a sheet. The fixing portion 6 includes a heating roller 61 and a pressing roller 62, and applies heat and pressure to the toner image transferred to the sheet to fix the toner image to the sheet. The sheet that has passed through the fixing portion 6 is transported along the sheet transport passage 20, and is discharged onto a discharge tray 22.

The image forming apparatus 100 is further provided with an operation/display portion 7 (operation panel). The operation/display portion 7 accepts an execution request for a scan job or a copy job from a user. Thus, the operation/display portion 7 corresponds to an "acceptor".

The operation/display portion 7 includes, for example, a touch-screen display 71. The touch-screen display 71 displays setting screens for accepting settings such as conditions for executing jobs, and accepts various setting operations (touch operations). The operation/display portion 7 is provided with various hardware keys 72 including a Start key. The operation/display portion 7 accepts a press on the Start key as an execution request for a job.

Figure 2:
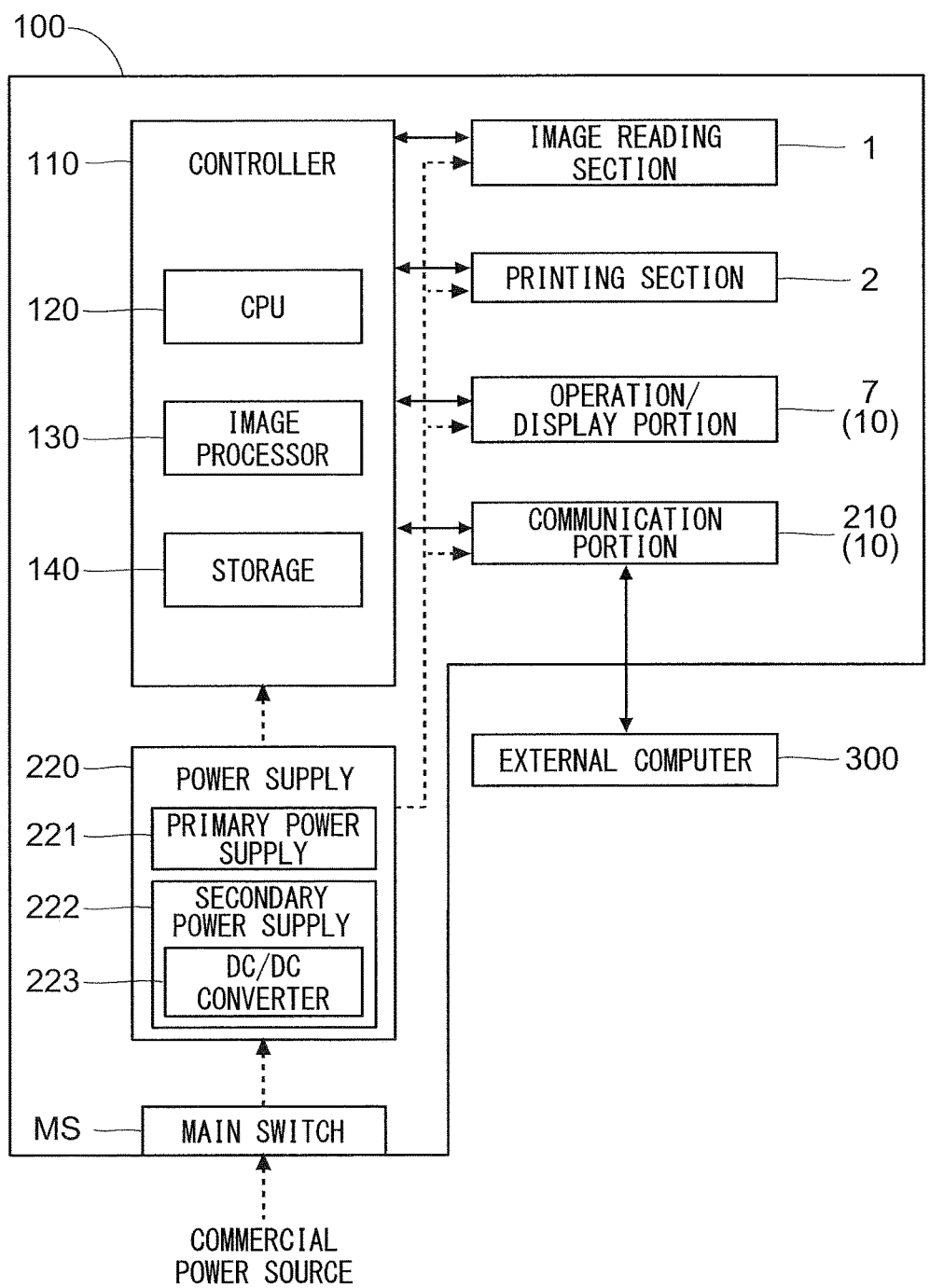
FIG. 2 is a diagram showing a hardware configuration of the image forming apparatus according to one embodiment of the present disclosure.

Hardware Configuration of the Image Forming Apparatus: As shown in FIG. 2, the image forming apparatus 100 is provided with a controller 110. The controller 110 includes a microprocessor such as a CPU (central processing unit) 120, an image processor 130, and a storage 140. The CPU 120 corresponds to a "processor". The CPU 120 executes control processing for controlling different parts of the image forming apparatus 100. The CPU 120 controls, for example, reading operation by the image reading section 1 and printing operation by the printing section 2. The CPU 120 also controls display operation by the operation/display portion 7, and detects operations made on the operation/display portion 7.

The image processor 130 comprises, for example, an ASIC (application specific integrated circuit) dedicated to image processing, and applies various kinds of image processing to image data. The storage 140 comprises non-volatile memory and volatile memory, and stores control programs and data. The various kinds of processing executed by the CPU 120 proceed according to the control programs and data stored in the storage 140.

The image forming apparatus 100 is further provided with a communication portion 210 (communication circuit) that is communicably connected to an external computer 300. The external computer 300 can be a user terminal (personal computer) that is used by a user of the image forming apparatus 100, or a server.

For example, when the image forming apparatus 100 is used as a printer, job data is generated on the external computer 300 (user terminal). The job data contains an execution request for a print job, image data of an image to be printed, printing conditions (e.g., the number of sheets to be printed and the sheet size), etc. The job data is transmitted from the external computer 300 to the image forming apparatus 100, where the communication portion 210 receives it (the communication portion 210 receives the execution request for the job). That is, like the operation/display portion 7, the communication portion 210 corresponds to an "acceptor". In the following description, the operation/display portion 7 and the communication portion 210 are occasionally referred to collectively as the acceptor 10.

The image forming apparatus 100 is also provided with a power supply 220. The power supply 220 generates voltages with which to operate different parts of the image forming apparatus 100, and supplies the voltages to different parts of the image forming apparatus 100. The power supply 220 is connected to a commercial power source via a main switch MS. Operating the main switch MS permits the supply of electric power to be turned ON and OFF. In FIG. 2, voltage supply lines are indicted by broken lines.

The power supply 220 is composed of a primary power supply 221 and a secondary power supply 222. The primary power supply 221 is supplied with electric power from the commercial power supply. The primary power supply 221 generates a direct-current voltage from the commercial power supply. The primary power supply 221 generates, for example, a direct-current voltage to be supplied to motors for rotating various rotary members such as rollers. The primary power supply 221 also outputs a direct-current voltage to the secondary power supply 222.

The secondary power supply 222 includes a DC/DC converter 223, and steps down the voltage generated by the primary power supply 221 to generate a necessary direct-current voltage. The secondary power supply 222 generates, for example, a direct-current voltage with which to operate the CPU, memory, etc. provided in the image forming apparatus 100.

Figure 3:
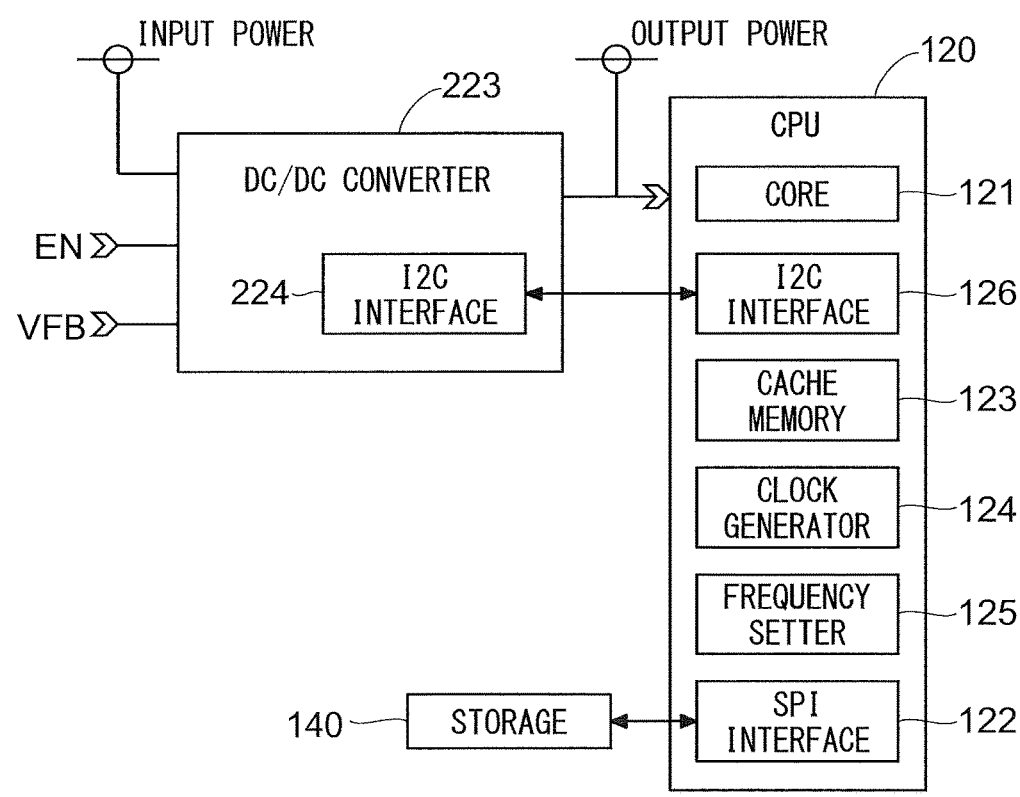
FIG. 3 is a diagram showing a configuration of a CPU (processor) and of a DC/DC converter (voltage generator) in the image forming apparatus according to one embodiment of the present disclosure.

Configuration of the CPU: As shown in FIG. 3, the CPU 120 includes a core 121, an SPI interface 122 for communication conforming to an SPI (serial peripheral interface) standard, a cache memory 123, a clock generator 124, and a frequency setter 125. The core 121 manages the entire CPU and executes various kinds of processing. The SPI interface 122 exchanges signals with an external device. For example, the SPI interface 122 is communicably connected to the storage 140 so that the SPI interface 122 can read data from and output data to the storage 140. The cache memory 123 stores data. The clock generator 124 generates an operation clock for the CPU 120. The frequency setter 125 sets the frequency of the operation clock generated by the clock generator 124.

The CPU 120 also includes an I2C interface 126 for communication conforming to an I2C (inter-integrated circuit) standard. Via the I2C interface 126, the CPU 120 communicates with the DC/DC converter 223.

Supply of a Voltage to the CPU: As shown in FIG. 3, the DC/DC converter 223 is provided with an I2C interface 224 for communication conforming to an I2C (inter-integrated circuit) standard. The I2C interface 224 is communicably connected to the I2C interface 126 in the CPU 120.

When started up, the CPU 120 conducts communication conforming to an I2C standard with the DC/DC converter 223. The CPU 120 conducts communication with the DC/DC converter 223 to adjust the output voltage of the DC/DC converter 223 (the voltage supplied to the CPU 120).

Now, with reference to a flow chart in FIG. 4, a description will be given of a flow of processing for supplying a voltage from the DC/DC converter 223 to the CPU 120.

Figure 4:
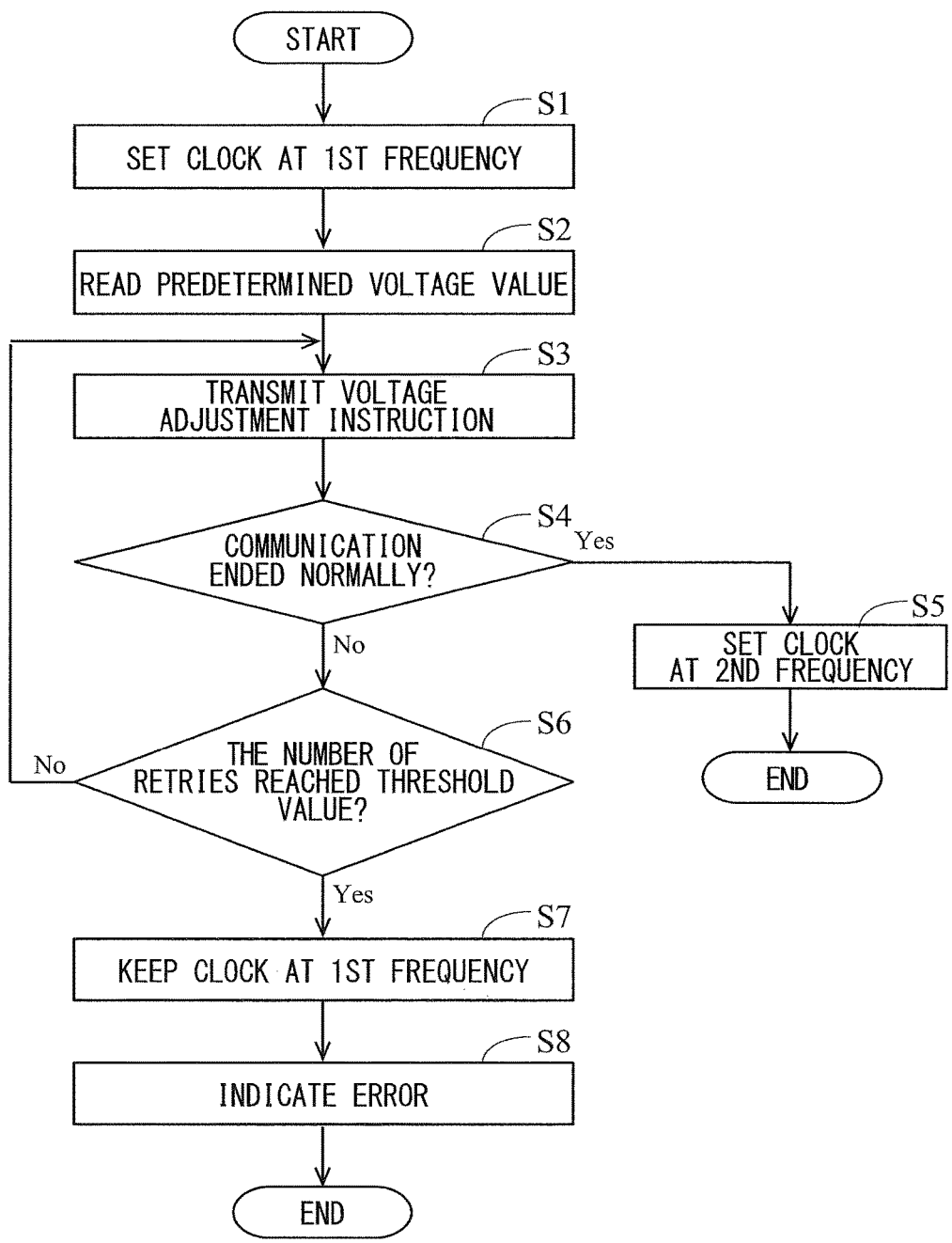
FIG. 4 is a flow chart illustrating a flow of processing executed when a voltage is supplied from the DC/DC converter to the CPU in the image forming apparatus according to one embodiment of the present disclosure.

The flow in FIG. 4 starts when the main switch MS is turned ON, that is, when the image forming apparatus 100 starts to be supplied with electric power and the DC/DC converter 223 starts to be supplied with a direct-current voltage. When the image forming apparatus 100 starts to be supplied with electric power, a voltage is supplied from the primary power supply 221 to the DC/DC converter 223, and an enable signal EN that is fed to the DC/DC converter 223 turns to H level, causing the DC/DC converter 223 to start to supply a voltage to the CPU 120. At this time, the CPU 120 is supplied with the minimum voltage necessary to operate the CPU 120 at the previously determined lowest frequency. This voltage corresponds to a "voltage in a first voltage range", and is in the following description referred to as the voltage in the first voltage range. The lowest frequency corresponds to a "first frequency", and is in the following description referred to as the first frequency.

At Step S1, the frequency setter 125 in the CPU 120 sets the frequency of the operation clock generated by the clock generator 124 at the first frequency (lowest frequency). Thus, the CPU 120 executes start-up processing with an operation clock of the first frequency. Once the CPU 120 has started up (when the CPU 120 has started to be supplied with the voltage in the first voltage range), communication via the I2C interface 126 is possible.

After the start-up of the CPU 120, at Step S2, the CPU 120 reads a predetermined voltage setting value from the storage 140. The voltage indicated by the predetermined voltage selling value is a voltage (rated voltage) necessary to operate the CPU 120 with an operation clock of a previously determined second frequency which is higher than the first frequency. This voltage corresponds to a "voltage in a second voltage range", and is in the following description referred to as the voltage in the second voltage range.

Subsequently, at Step S3, the CPU 120 communicates with the DC/DC converter 223, and transmits a voltage adjustment instruction to the DC/DC converter 223 to make it supply the voltage in the second voltage range. On receiving the voltage adjustment instruction, the DC/DC converter 223 performs voltage adjustment. At this time, referring to a feedback voltage VFB that is commensurate with the output voltage (the voltage supplied to the CPU 120), the DC/DC converter 223 adjusts the output voltage so as to make it a voltage in the second voltage range. On completing the voltage adjustment, the DC/DC converter 223 communicates with the CPU 120, and transmits a completion notice conveying that the voltage adjustment is complete, to the CPU 120.

Subsequently at Step S4, the CPU 120 checks whether or not communication related to voltage adjustment has ended normally. Here, communication related to voltage adjustment is communication for the adjustment of the voltage supplied from the DC/DC converter 223 to the CPU 120, and involves exchange of a voltage adjustment instruction between the CPU 120 and the DC/DC converter 223 and exchange of a completion notice between the CPU 120 and the DC/DC converter 223.

For example, when the transmission of a voltage adjustment instruction from the CPU 120 to the DC/DC converter 223 is not performed normally, no transmission of a completion notice from the DC/DC converter 223 to the CPU 120 takes place. Even when the transmission of a voltage adjustment instruction from the CPU 120 to the DC/DC converter 223 is performed normally, the transmission of a completion notice from the DC/DC converter 223 to the CPU 120 may not be performed normally. Accordingly, if the CPU 120 receives a completion notice from the DC/DC converter 223, it judges that communication related to voltage adjustment has ended normally; if the CPU 120 receives no completion notice from the DC/DC converter 223, it judges that communication related to voltage adjustment has not ended normally.

If, at Step S4, the CPU 120 judges that communication related to voltage adjustment has ended normally, the flow proceeds to Step S5. From Step S5 onward, the CPU 120 executes processing thereafter with an operation clock of the second frequency (it executes processing in an ordinary mode). That is, the frequency setter 125 sets the frequency of the operation clock generated by the clock generator 124 at the second frequency.

If, at Step S4, the CPU 120 judges that communication related to voltage adjustment has not ended normally, the flow proceeds to Step S6. At Step S6, the CPU 120 checks whether or not the number of times that retry processing for transmitting a voltage adjustment instruction to the DC/DC converter 223 once again has been executed successively (the number of retries) has reached a previously determined threshold value. If the CPU 120 judges that the number of retries has not reached the threshold value, the flow returns to Step S3. That is, in this case, retry processing (transmission of a voltage adjustment instruction from the CPU 120 to the DC/DC converter 223) is executed.

On the other hand, if, at Step S6, the CPU 120 judges that the number of retries has reached the threshold value, the flow proceeds to Step S7. From Step S7 onward, the CPU 120 executes processing thereafter with an operation clock of the first frequency (it executes processing in a low-performance mode). That is, if communication related to voltage adjustment does not end normally even after retry processing has been executed the number of times equal to the threshold value, the CPU 120 keeps the frequency of the operation clock at the first frequency. Thereafter, the flow proceeds to Step S8.

In a case where a PMIC (power management IC) is provided for controlling the supply of electric power, what is executed as the retry processing may be processing in which the PMIC so switches the enable signal EN as to momentarily stop and then restart the operation of the DC/DC converter 223 (processing whereby a voltage is supplied anew from the DC/DC converter 223 to the CPU 120).

At Step S8, the CPU 120 executes error indicating processing to indicate that communication related to voltage adjustment has not ended normally (that an error has occurred).

Figure 5:
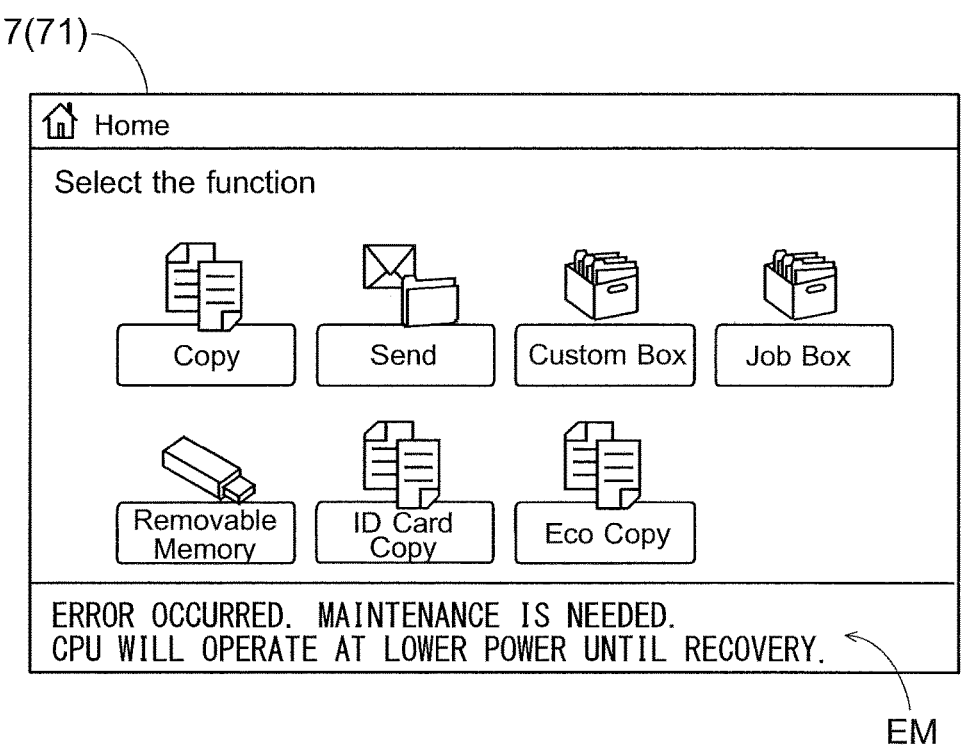
FIG. 5 is a diagram showing an error message displayed on an operation/display portion in the image forming apparatus according to one embodiment of the present disclosure.

For example, the CPU 120 makes the operation/display portion 7 display an error message EM as shown in FIG. 5. The error message EM can prompt for maintenance and indicate that the CPU 120 executes processing at reduced processing power (processing speed) until a recovery is made from the error.

The CPU 120 can also transmit an error notice conveying that communication related to voltage adjustment has not ended normally (that an error has occurred) to the external computer 300 (user terminal). On receiving the error notice, the external computer 300 displays a message like the error message EM shown in FIG. 5.

Next, with reference to a flow chart in FIG. 6, a description will be given of a flow of processing that is executed on receiving an execution request for a job when communication related to voltage adjustment has not ended normally. At the time point that the flow shown in FIG. 6 starts, the CPU 120 is executing accepting processing for controlling the acceptor 10 (the operation/display portion 7 and the communication portion 210) with an operation clock of the first frequency. The accepting processing by the CPU 120 involves, for example, communicating with the acceptor 10 to feeds various instructions to the acceptor 10, and detecting the status of the acceptor 10 (e.g., detecting whether or not an execution request for a job has been accepted). In other words, the CPU 120 leaves the operation/display portion 7 enabled to be operated and the communication portion 210 enabled to conduct communication.

Figure 6:
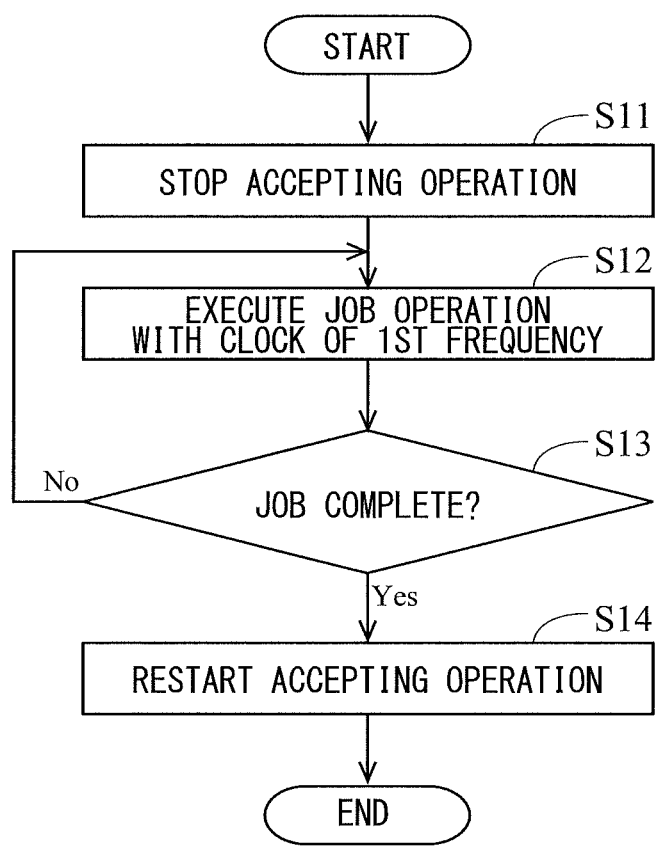
FIG. 6 is a flow chart illustrating a flow of processing executed on receiving an execution request for a job when communication related to voltage adjustment has not ended normally in the image forming apparatus according to one embodiment of the present disclosure.

When, with the CPU 120 executing the accepting processing with an operation clock of the first frequency, the acceptor 10 receives an execution request for a job, the flow shown in FIG. 6 starts. At this point, the error message EM (see FIG. 5) is being displayed on the operation/display portion 7.

When the acceptor 10 accepts an execution request for a job, then, at Step S11, the CPU 120 stops accepting processing. Then, at Step S12, the CPU 120 executes, with an operation clock of the first frequency, job processing for executing the job for which the acceptor 10 has received the execution request. The job processing executed by the CPU 120 is, for example, RIP (raster image processing), which is an image processing for generating image data for printing.

Here, with the frequency of the operation clock of the CPU 120 set at the first frequency, the CPU 120 executes processing at lower processing power (processing speed) than with the frequency of the operation clock of the CPU 120 set at the second frequency. Accordingly, the CPU 120 makes job execution parts, such as the image reading section 1 and the printing section 2, operate in a low-performance mode. For example, in a case where a job to be executed is one involving scanning, the image reading section 1, operating in a low-performance mode, reads a document at lower resolution than when the CPU 120 executes job processing with an operation clock of the second frequency. For another example, in a case where a job to be executed is one involving printing, the image reading section 1, operating in a low-performance mode, secures a larger interval (sheet-to-sheet interval) between successively transported sheets than when the CPU 120 executes job processing with an operation clock of the second frequency.

Then, at Step S13, the CPU 120 checks whether or not the job is complete. If the CPU 120 judges that the job is complete, the flow proceeds to Step S14; if the CPU 120 judges that the job is not complete, the flow returns to Step S12.

At Step S14, the CPU 120 restarts accepting processing. Here, the CPU 120 executes accepting processing with an operation clock of the first frequency. The CPU 120 keeps the operation/display portion 7 displaying the error message EM (see FIG. 5).

As described above, the image forming apparatus 100 according to the embodiment includes an I2C interface 126 (first communication portion), also includes a CPU 120 (processor) which executes processing based on a set operation clock and a I2C interface 224 (second communication portion) which is communicably connected to the I2C interface 126, and is provided with a DC/DC converter 223 (voltage generator) which generates a voltage with which to operate the CPU 120 and which supplies the voltage to the CPU 120. When the CPU 120, in a state not supplied with a voltage, is supplied with, from the DC/DC converter 223, a voltage in a first voltage range that is necessary for the CPU 120 to start up, the CPU 120 sets the frequency of the operation clock at a first frequency to execute start-up processing with the operation clock of the first frequency, and transmits, via the I2C interface 126 to the DC/DC converter 223, a voltage adjustment instruction for making the DC/DC converter 223 supply a voltage in a second voltage range that is necessary for the CPU 120 to operate with an operation clock of a previously determined second frequency that is higher than the first frequency. When the I2C interface 224 receives the voltage adjustment instruction, the DC/DC converter 223 performs voltage adjustment to make the voltage supplied to the CPU 120 a voltage in the second voltage range, and, when the voltage adjustment is complete, the DC/DC converter 223 transmits, via the I2C interface 224 to the CPU 120, a completion notice conveying that the voltage adjustment is complete. When communication related to the voltage adjustment ends normally, the CPU 120 sets the frequency of the operation clock at the second frequency to execute processing thereafter based on the operation clock of the second frequency. When the communication related to the voltage adjustment does not end normally, the CPU 120 keeps the frequency of the operation clock at the first frequency to execute processing thereafter based on the operation clock of the first frequency.

In the embodiment, as described above, if the communication related to the voltage adjustment does not end normally, the frequency of the operation clock of the CPU 120 is kept at the first frequency so that the CPU 120 thereafter executes processing based on the operation clock of the first frequency. Thus, the CPU 120 executes processing at lower processing power (processing speed) than when the frequency of the operation clock of the CPU 120 is set at the second frequency, but still the image forming apparatus 100 can be used. It is thus possible to avoid the inconvenience of the image forming apparatus 100 being unusable until the completion of maintenance work for recovery from a communication error, and thereby to improve user-friendliness.

In the embodiment, as described above, if the communication related to the voltage adjustment does not end normally, the CPU 120 executes accepting processing for controlling an acceptor 10 (an operation/display portion 7 and a communication portion 210) based on the operation clock of the first frequency, and when the acceptor 10 accepts an execution request for a job, the CPU 120 stops the accepting processing and executes, based on the operation clock of the first frequency, job processing for executing the job for which the acceptor 10 has accepted the execution request. When the job accepted by the acceptor 10 is complete, the CPU 120 restarts the accepting processing, as it was executing it previously, based on the operation clock of the first frequency.

Here, if the communication related to the voltage adjustment does not end normally, the frequency of the operation clock of the CPU 120 is set at the first frequency, and thus the CPU 120 executes processing at reduced processing power. Thus, it is preferable to adopt a configuration where, while the CPU 120 is executing job processing, the CPU 120 does not execute accepting processing. If, for the sake of discussion, the CPU 120 executes both accepting processing and job processing with its processing power reduced, it may inconveniently freeze (take an extremely long time to execute the necessary processing).

In the embodiment, as described above, when, with the frequency of the operation clock set at the first frequency, the CPU 120 receives an execution request for a job (a scan job, a copy job, or a print job), it makes job execution parts, such as an image reading section 1 and a printing section 2, operate in a low-performance mode. Thus, even with the CPU 120 executing processing with reduced processing power, a job requested by a user can be executed.

If a user is unaware of a communication error occurring in the image forming apparatus 100, the image forming apparatus 100 continues being used without the CPU 120 executing processing at rated processing power. To avoid that, in the embodiment, as described above, if the communication related to the voltage adjustment does not end normally, the CPU 120 executes error indicating processing for indicating that the communication related to the voltage adjustment has not ended normally (that an error has occurred). For example, the CPU 120 makes the operation/display portion 7 display an error message EM. Or, the CPU 120 makes the communication portion 210 transmit an error notice to an external computer 300 (user terminal). This permits a user to recognize that an error has occurred (the image forming apparatus 100 needs maintenance). In this way, it is possible to avoid continued use of the image forming apparatus 100 without an error being eliminated (with the CPU 120 executing processing at less than rated processing power).

In the embodiment, as described above, if the communication related to the voltage adjustment does not end normally, the CPU 120 executes retry processing in which it transmits the voltage adjustment instruction to the DC/DC converter 223 once again, and if the communication does not end normally even after the retry processing is executed a previously determined number of times, the CPU 120 keeps the frequency of the operation clock at the first frequency to execute processing thereafter based on the operation clock of the first frequency. In this way, when communication failure between the CPU 120 and the DC/DC converter 223 is temporary (when it is of a type that can be eliminated by retry processing), it is possible to avoid unnecessarily reducing the processing power of the CPU 120.

It should be understood that the embodiments discloses herein are in every aspect illustrative and not restrictive. The scope of the present disclosure is defined not by the description of embodiments given above but by the appended claims, and encompasses any modification in the scope equivalent to that of the claims.

What is claimed is:

1. An image forming apparatus, comprising:
   a processor which executes processing based on a set operation clock; and
   a voltage generator which is communicably connected to the processor, the voltage generator generating a voltage with which to operate the processor and supplying the voltage to the processor, wherein
   when the processor, in a state not supplied with a voltage, receives from the voltage generator a voltage in a first voltage range that is necessary for the processor to start up, the processor sets a frequency of the operation clock at a first frequency to execute start-up processing with the operation clock of the first frequency, and transmits to the voltage generator a voltage adjustment instruction to make the voltage generator supply a voltage in a second voltage range that is necessary for the processor to execute processing with the operation clock of a previously determined second frequency that is higher than the first frequency,
   when the voltage generator receives the voltage adjustment instruction, the voltage generator performs voltage adjustment to make the voltage supplied to the processor a voltage in the second voltage range, and, when the voltage adjustment is complete, the voltage generator transmits to the processor a completion notice conveying that the voltage adjustment is complete, and
   when communication related to the voltage adjustment ends normally, the processor sets the frequency of the operation clock at the second frequency to execute processing thereafter based on the operation clock of the second frequency, and, when the communication related to the voltage adjustment does not end normally, the processor keeps the frequency of the operation clock at the first frequency to execute processing thereafter based on the operation clock of the first frequency
   the image forming apparatus, further comprising:
   an acceptor which accepts an execution request for a job, wherein
   when the communication related to the voltage adjustment does not end normally, the processor executes accepting processing for controlling the acceptor based on the operation clock of the first frequency, and, when the acceptor accepts the execution request for a job, the processor stops the accepting processing and executes, based on the operation clock of the first frequency, job processing for executing the job for which the acceptor accepted the execution request.

2. The image forming apparatus of claim 1, further comprising:
   a printing section which, when the acceptor accepts a job involving printing, transports a sheet, forms a toner image based on image data, and prints the toner image on the sheet that is being transported, wherein
   when the processor executes the job processing based on the operation clock of the first frequency, the printing section secures a larger interval between successively transported sheets than when the processor executes the job processing based on the operation clock of the second frequency.

3. The image forming apparatus of claim 1, further comprising:
   an image reading section which, when the acceptor accepts a job involving reading of a document, reads the document, wherein
   when the processor executes the job processing based on the operation clock of the first frequency, the image reading section reads the document at a lower resolution than when the processor executes the job processing based on the operation clock of the second frequency.

4. The image forming apparatus of claim 1, wherein
   when the job accepted by the acceptor is complete, the processor restarts the accepting processing based on the operation clock of the first frequency.

5. The image forming apparatus of claim 1, wherein
   the acceptor is an operation/display portion which displays a screen for accepting an execution request for a job to accept the execution request for the job, and
   when the communication related to the voltage adjustment does not end normally, the processor makes the operation/display portion display an error message indicating that the communication related to the voltage adjustment has not ended normally.

6. The image forming apparatus of claim 1, wherein
   the acceptor is a communication portion which is communicably connected to an external computer and which receives the execution request for a job from the computer, and
   when the communication related to the voltage adjustment does not end normally, the processor makes the communication portion transmit to the computer an error notice indicating that the communication related to the voltage adjustment has not ended normally.

7. The image forming apparatus of claim 1, wherein when the communication related to the voltage adjustment does not end normally, the processor executes retry processing in which the processor transmits the voltage adjustment instruction to the voltage generator once again, and, when the communication related to the voltage adjustment does not end normally even after the retry processing is executed the previously determined number of times, the processor keeps the frequency of the operation clock at the first frequency to execute processing thereafter based on the operation clock of the first frequency.

* * * * *